June 19, 1928.
H. B. LINDLEY
1,673,835
SEPARATOR
Filed April 10, 1922
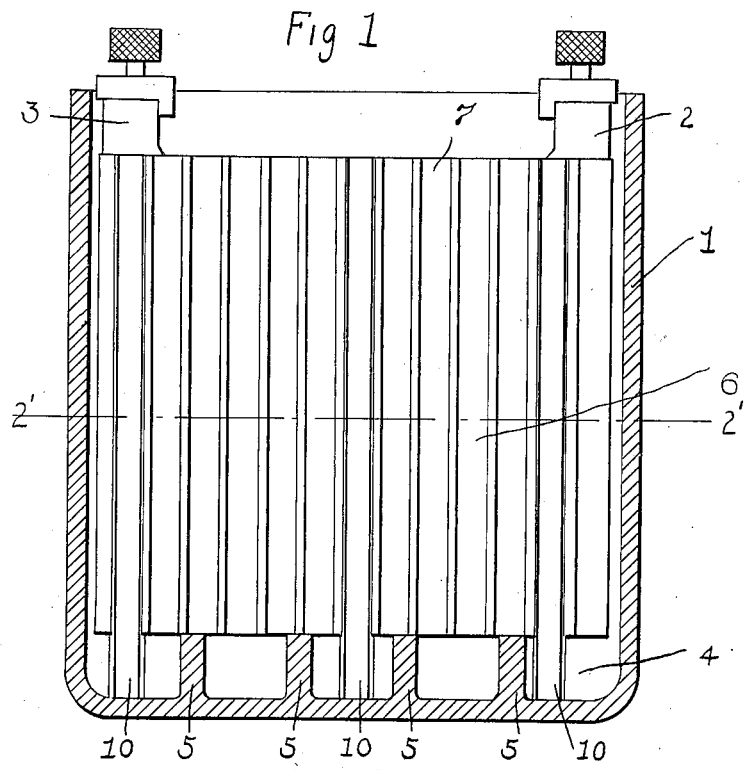
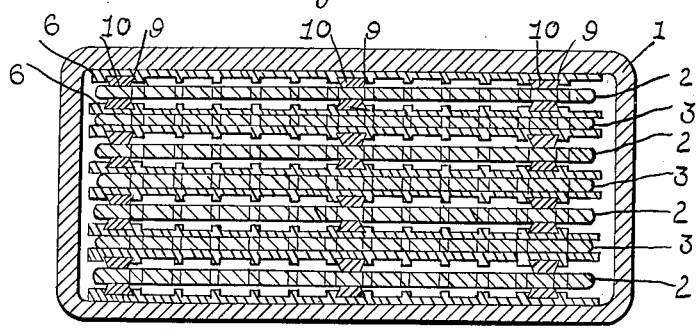
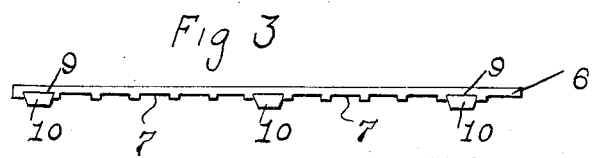
H. B. Lindley
INVENTOR
BY Victor J. Evans
ATTORNEY
WITNESS:

Patented June 19, 1928.

1,673,835

UNITED STATES PATENT OFFICE.

HUGH BRYON LINDLEY, OF HATTIESBURG, MISSISSIPPI, ASSIGNOR OF ONE-HALF TO ADRIAN K. McINNIS, OF HATTIESBURG, MISSISSIPPI.

SEPARATOR.

Application filed April 10, 1922. Serial No. 551,068.

This invention relates to improvements in batteries, the general object of the invention being to provide a separator for the plates of the battery having reinforced strips at least partly embedded therein so that it will last for a long time and thus increase the life of the battery.

This invention also consists in certain other features of construction and in the combination and arrangement of the several parts, to be hereinafter fully described, illustrated in the accompanying drawings and pointed out in the appended claims.

In describing my invention in detail, reference will be had to the accompanying drawings wherein like characters denote like or corresponding parts throughout the several views, and in which:—

Figure 1 is a sectional view through a battery showing my improved separators in place.

Figure 2 is a sectional view taken on line 2—2 of Figure 1.

Figure 3 is a detail view of one of the separators showing the reinforcing strips applied thereto.

In these views 1 indicates the jar, 2 the positive plates and 3 the negative plates. The jar is provided with the usual sediment chambers 4 at its bottom, the plates resting upon the partitions 5 of said chambers. The separators are shown at 6, and are provided with a plurality of parallel grooves 7 having straight side walls and a number of special grooves 9 in its grooved face for receiving the reinforcing strips 10. The grooves 9 are formed with converging side walls and one of the grooves 9 is centrally disposed in each separator and one at each end thereof as clearly shown in Figure 3 of the drawings. These strips are made thicker than the grooves so that portions of the strips will project from the grooves and thus engage the positive plate. These strips are of greater length than the separator so that the lower ends will engage the bottom of the jar, as shown. The strips therefor may be formed of hard rubber, glass or any other suitable insulating material and are substantially cross sectional wedge shaped to conform to the side walls of the grooves 9 to prevent casual displacement therefrom.

These reinforcing strips will increase the life of the separators and they will also keep the negative plates from bulging so that the life of the battery is increased and separators constructed in accordance with my invention will last as long as the plates. The reinforcing and wear-resisting strips are at least partly embedded in the separator sheet, and will not only support the sheet but will also resist wear due to vibration of the electrode plates of the battery.

It is thought from the foregoing description that the advantages and novel features of my invention will be readily apparent.

I desire it to be understood that I may make changes in the construction and in the combination and arrangement of the several parts, provided that such changes fall within the scope of the appended claims.

What I claim is:—

1. A separator for storage battery plates having a plurality of grooves provided with straight side walls and a centrally disposed groove and end grooves provided with converging side walls, and a cross sectional substantially wedge shaped strip of insulating material received in the end and centrally disposed grooves respectively as and for the purpose specified.

2. A separator for storage cells comprising a sheet of suitable material and wear-resisting strips at least partly embedded in one face thereof.

3. A separator for storage cells comprising a sheet of suitable material having grooves of dove-tailed cross-section terminating at opposite edges of the sheet, and strips of similar cross-section secured in said grooves.

4. A separator for storage cells comprising a sheet of suitable material having grooves in one side thereof and extending to opposite edges of the sheet, and wear-resisting strips at least partly embedded in said grooves.

In testimony whereof I affix my signature.

HUGH BRYON LINDLEY.